Dec. 16, 1969  LA ROY E. ROBINSON ET AL  3,483,783
VIBRATION INHIBITING MEAN FOR BAND SAWS
Filed Jan. 30, 1968  2 Sheets-Sheet 1
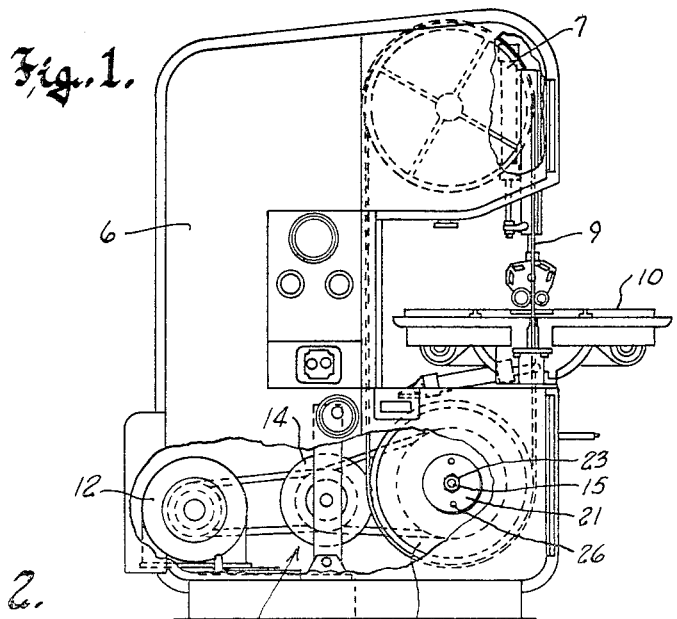
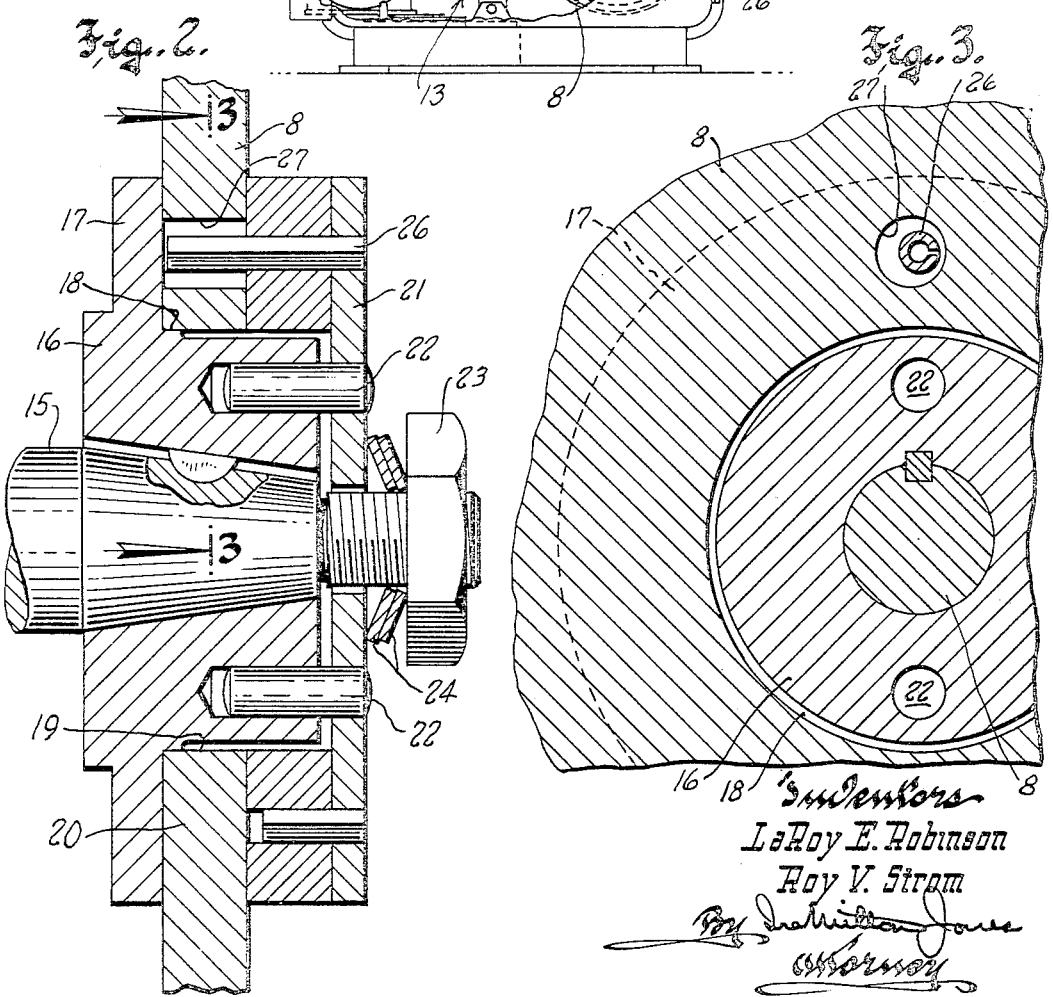
Inventors
LaRoy E. Robinson
Roy V. Strom

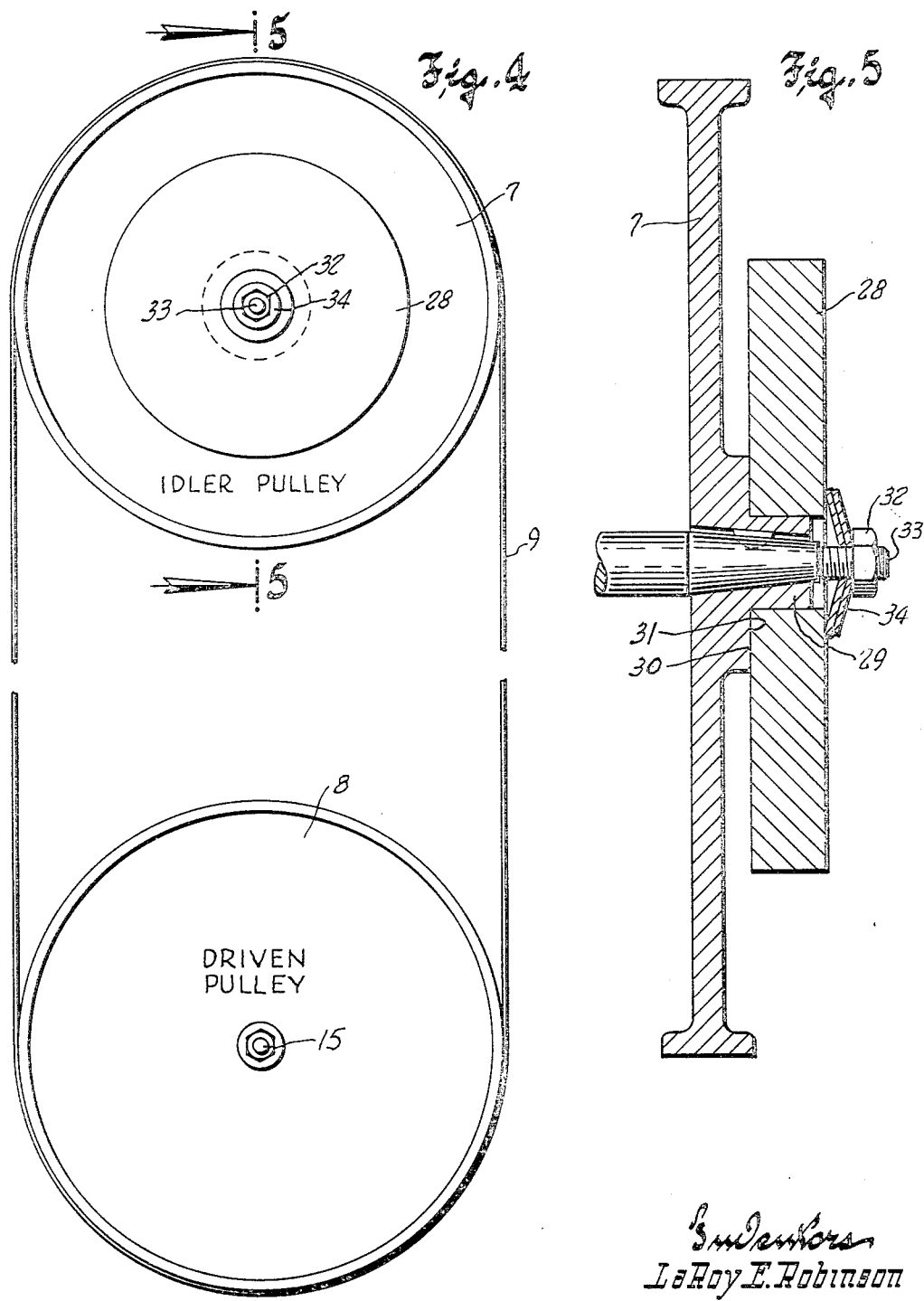

United States Patent Office 3,483,783
Patented Dec. 16, 1969

3,483,783
VIBRATION INHIBITING MEANS FOR BAND SAWS
La Roy E. Robinson, Hopkins, and Roy V. Strom, Prior Lake, Minn., assignors to Continental Machines, Inc., Savage, Minn., a corporation of Minnesota
Filed Jan. 30, 1968, Ser. No. 701,728
Int. Cl. B26d 1/48
U.S. Cl. 83—201                         6 Claims

ABSTRACT OF THE DISCLOSURE

A band saw with an endless cutting band trained over spaced pulleys has a surface on the hub portion of one of its pulleys frictionally engaged with a mating surface on a rotary element which is mounted to turn about the axis of that pulley and which runs at a selected constant speed during operation of the machine, so that by frictional resistance to relative motion of said surfaces, forces which tend to cause vibration-producing fluctuations in the speed of the cutting band as work is being cut, are absorbed.

---

This invention relates to band saws and refers more particularly to metal cutting band saws.

Any vibration or chatter present in a machine tool seriously affects the quality of the work that can be performed thereby, and in the case of metal cutting band saws, vibration is especially harmful.

With a view toward achieving high quality, accurate cutting, band saws were designed and built with meticulous attention to close tolerances and precision workmanship, only to find that the vibration level in those machines was higher than ever. Many theories were advanced to explain why these precision made machines vibrated so objectionably. It was finally deduced that the cause lay in the imperceptible though apparently inevitable fluctuations in speed of the cutting band due to variations in its cutting ability along the length thereof, and conversion of those speed fluctuations into harmonic vibration of the power transmission system by which the band is driven.

This deduction led to the discovery that the incorporation of a frictionally resisted lost motion connection between one of the band pulleys and a rotary element which turns at a uniform selected speed during operation of the machine, corrected the difficulty. Apparently therefore, objectionable vibration in a metal cutting band saw can be eliminated by providing some means for absorbing the forces which tend to cause vibration-producing fluctuations in band speed. With that in mind, it is the purpose and object of this invention to provide a band saw in which the power transmitting system by which the saw band is driven from a power source—such as an electric motor—incorporates a frictional driving connection through which torque is transmitted and which, through slippage between frictionally contacting surfaces, takes transient vibration-producing forces out of the system without returning another force, as would be the case in any resilient type of shock absorber.

Stated in another way, it is the purpose of this invention to provide a band saw wherein a rotating element that is sensitive to the forces that tend to cause fluctuations in band speed, has a frictional torque transmitting connection with another rotating element that turns at a selected constant speed, so that the frictional resistance to relative motion between these rotary elements absorbs the forces acting on the cutting band which tend to cause vibration producing fluctuations in band speed.

With these observations and objects in mind, the manner in which the invention achieves its purpose will be appreciated from the following description and the accompanying drawings. This disclosure is intended merely to exemplify the invention. The invention is not limited to the particular structure disclosed, and changes can be made therein which lie within the scope of the appended claims without departing from the invention.

The drawings illustrate two complete examples of the physical embodiments of the invention, constructed according to the best modes so far devised for the practical application of the principles thereof, and in which:

FIGURE 1 is a front view of a conventional metal cutting band saw, such as that disclosed in the Crane Patent No. 2,626,965, embodying this invention in its preferred form, wherein the vibration absorbing structure is located at the driven band pulley;

FIGURE 2 is a sectional view through the hub portion of the driven pulley of the band saw, on an enlarged scale to better illustrate the embodiment of the invention employed in the band saw shown in FIGURE 1;

FIGURE 3 is a detail sectional view through FIGURE 2 on the plane of the line 3—3;

FIGURE 4 diagrammatically illustrates another embodiment of the invention, wherein the vibration absorbing means is located at the idler pulley; and FIGURE 5 is a detail sectional view through the idler pulley of FIGURE 4.

Referring to the accompanying drawings, the numeral 6 designates the C-shaped frame of a metal cutting band saw such as that of the aforementioned Crane patent. The arms of the frame mount upper and lower pulleys 7 and 8 around which the flexible endless cutting band 9 of the machine is trained. The lower pulley 8 is power driven to impart high speed linear travel to the band with one stretch thereof passing downwardly through a work-supporting table 10. The band has a cutting edge which may be toothed or abrasive, by which it cuts through work placed upon the table and fed against the band. The space above this table and below the upper arm of the C-shaped frame thus constitutes the work zone of the machine.

Power to drive the cutting band is derived from a motor 12 which is drivingly connected with the lower pulley 8 through a transmission system indicated generally by the numeral 13. This power transmission system comprises a variable speed drive unit 14 having pulley and belt connections 15' with the motor and the lower band pulley 8.

Adjustment of the variable speed drive sets the speed at which the cutting band should travel to cut a particular workpiece.

Absolutely uniform cutting effectiveness around the entire length of the band is an objective seldom, if ever, reached in practice. Consequently, during the cutting action uneven forces are engendered which tend to cause vibration-producing fluctuations in band speed. As noted hereinbefore, the vibration that resulted from these uneven forces in machines that were specially designed and precision built with a view towards producing an exceptionally fine band saw, was so severe that a solution to this vibration problem had to be found.

The answer lay in finding a way to absorb the forces which caused the vibration-producing fluctuations in band speed. One way in which this is done is to provide an impositive frictional torque transmitting connection between the driven pulley 8 and the power transmitting system, and more particularly between the pulley 8 and the driven shaft 15 upon which the pulley is mounted. To this end, the pulley is fitted onto a hub 16 which is keyed to the shaft to turn directly therewith. The hub has an annular flange 17 and a pilot shoulder 18 at the base of the flange. The shoulder 18 snugly fits a hole 19 in the central or hub portion 20 of the pulley to center the same, and when the pulley is in position on the hub the back face of its web has surface-to-surface engagement with the flange 17.

Frictional contact is maintained at this surface-to-surface engagement by a clamping collar 21 which is axially slidably, though non-rotatably connected to the hub 16 by pins 22 and presses the hub portion of the pulley web against the flange. A clamping nut 23 threaded onto the shaft applies this pressure through spring washers 24, preferably of the Bellevelle type. Actually, the hub portion of the pulley is tightly clamped between the flange 17 and the collar 21. Nevertheless, the connection between the shaft 15 and the pulley 8 is impositive.

The impositive nature of the connection between the shaft 15 and the pulley 8 permits relative rotation therebetween, but only to the extent the force of friction at the connection is overcome by the forces which tend to cause fluctuation in band speed.

It follows, therefore, that in overcoming the friction which resists relative rotation between the pulley 8 and the shaft 15, the energy of the forces that tend to produce that relative rotation is dissipated by being converted into heat.

Preferably the aforesaid relative rotation between the shaft 15 and the pulley 8 is limited by a roll-pin 26 fixed to the clamping collar 21 and projecting into a hole 27 in the pulley web, the hole being considerably larger in diameter than the pin. Since the pulses which result from fluctuations in band speed are constantly reversing in direction, it follows that in the event relative rotation between the pulley of the shaft is great enough to bring the pin 26 into engagement with one side of the hole 27, a subsequent reversal in direction of such relative motion will carry the pin away from the edge of the hole.

In that embodiment of the invention illustrated in FIGURES 4 and 5, the forces which tend to cause vibration producing fluctuations in band speed are absorbed by friction between the idler pulley 7 and a flywheel 28. The specific structure by which this is accomplished may take different forms, but for illustration the idler pulley has a hub 29 upon which the flywheel is mounted with its inner surface 30 in frictional engagement with a complementary outwardly facing surface 31 on the hub portion of the flywheel. These surfaces are held in frictional engagement by a clamping nut 32 threaded on to the end of the shaft 33 upon which the pulley is mounted, and a pair of Bellevelle spring washers 34.

As will be apparent, the flywheel 28 constitutes a rotary member which turns at a constant speed and the pulley 7, is of course sensitive to the forces which tend to cause vibration-producing fluctuations in band speed.

Hence, as in the other embodiment of the invention, the vibration producing forces are absorbed or dissipated as these forces react against the force of friction which resists relative rotation between the pulley 7 and the flywheel 28.

What is claimed as our invention is:

1. A band type cutting machine having an endless flexible cutting band with a cutting edge, trained over spaced apart pulleys with a stretch of the band passing through a work zone, and power driven means for driving one of said pulleys to impart high speed linear travel to the band, said machine being characterized by means for absorbing vibration producing shock impulses resulting from forces that tend to cause fluctuations in band speed as work is being cut, said means comprising:
   (A) a rotary element connected with one of the pulleys to be senstive to forces that tend to cause fluctuations in band speed;
   (B) another rotary element which rotates at a constant selected speed during operation of the machine;
   (C) complementary contacting friction surfaces on said two rotary elements; and
   (D) means reacting between said two rotary elements to maintain their contacting surfaces in frictional engagement to thereby resist relative rotation between said rotary elements.

2. The machine of claim 1, wherein said first named rotary element is a part of one of the pulleys.

3. The machine of claim 1, wherein said first named rotary element is the hub portion of the driven pulley, and the other rotary element is a part of said power driven means.

4. The machine of claim 3, wherein said other rotary element comprises a driven shaft and a hub fixed to said shaft and having the hub portion of the driven pulley mounted thereon, said hub having an annular flange,
   and wherein said contacting friction surfaces are on said flange and the hub portion of the driven pulley.

5. The machine of claim 4, wherein the means for maintaining the friction surfaces in engagement comprises
   a collar non-rotatably but axially movably coupled to said hub with its peripheral portion extending radially therefrom and overlying the flange on the hub to clamp the hub portion of the driven pulley between it and the flange,
      and clamping means including a compression spring to draw the collar axially towards the hub.

6. The machine of claim 3, further characterized by means to limit friction resisted relative rotation between said rotary elements.

References Cited

UNITED STATES PATENTS 2,903,027  9/1959  Edgemond et al. _____ 83—201.15
3,155,087  11/1964  Dreyfus _____ 125—21

JAMES M. MEISTER, Primary Examiner

U.S. Cl. X.R.

51—135; 143—30